(12) United States Patent
Segreto

(10) Patent No.: US 7,207,603 B2
(45) Date of Patent: Apr. 24, 2007

(54) INSULATED TUBULAR ASSEMBLY

(75) Inventor: Salvador Segreto, Metairie, LA (US)

(73) Assignee: Grant Prideco, L.P., Houston, TX (US)

( * ) Notice: Subject to any disclaimer, the term of this patent is extended or adjusted under 35 U.S.C. 154(b) by 18 days.

(21) Appl. No.: 10/385,361

(22) Filed: Mar. 11, 2003

(65) Prior Publication Data

US 2004/0178626 A1 Sep. 16, 2004

(51) Int. Cl.
*F16L 11/12* (2006.01)
(52) U.S. Cl. .................. 285/47; 285/48; 285/123.3; 285/333
(58) Field of Classification Search .......... 285/47, 285/48, 123.3, 333, 904
See application file for complete search history.

(56) References Cited

U.S. PATENT DOCUMENTS

| | | | |
|---|---|---|---|
| 3,680,631 A | | 8/1972 | Allen et al. |
| 3,693,665 A | * | 9/1972 | Veerling et al. ............ 138/149 |
| 3,720,267 A | | 3/1973 | Allen et al. |
| 3,763,935 A | | 10/1973 | Perkins |
| 3,794,358 A | * | 2/1974 | Allen et al. .................... 285/47 |
| 4,332,401 A | * | 6/1982 | Stephenson et al. .......... 285/47 |
| 4,340,245 A | * | 7/1982 | Stalder ........................ 285/53 |
| 4,415,184 A | | 11/1983 | Stephenson et al. |
| 4,512,721 A | | 4/1985 | Ayres et al. |
| 4,515,397 A | | 5/1985 | Nowobilski et al. |
| 4,518,175 A | | 5/1985 | Richards et al. |
| 4,538,834 A | | 9/1985 | Brady et al. |
| 4,566,495 A | * | 1/1986 | Baker et al. ................. 138/149 |
| 4,579,373 A | * | 4/1986 | Neal et al. .................... 285/47 |
| 4,624,485 A | * | 11/1986 | McStravick et al. .......... 285/47 |
| 4,635,967 A | * | 1/1987 | Stephenson .................. 285/45 |
| 4,693,313 A | | 9/1987 | Stephenson et al. |
| 4,793,383 A | * | 12/1988 | Gyory et al. ................ 138/114 |
| 5,862,866 A | * | 1/1999 | Springer ..................... 166/380 |
| 5,868,437 A | * | 2/1999 | Teague ......................... 285/45 |
| 6,231,086 B1 | * | 5/2001 | Tierling ................. 285/123.15 |

FOREIGN PATENT DOCUMENTS

GB 2076499 * 5/1980 .................. 285/47

OTHER PUBLICATIONS

SPE 15056, Wellbore Refluxing in Steam Injection Wells by G.P. Willhite, U. of Kansas, and S. Griston, Chevron Oil Field Research Co., Prepared for Presentation at the 56th California Regional Meeting of the Society of Petroleum Engineers held in Oakland, CA, Apr. 2-4, 1988.
New Double-Walled Tubulars Can Aid Thermal-Recovery Operation, Bernard V. Traynor, General Electric Co., Oil & Gas Journal, Feb. 18, 1980.

* cited by examiner

*Primary Examiner*—David Bochna
(74) *Attorney, Agent, or Firm*—C. James Bushman; Browning Bushman P.C.

(57) ABSTRACT

A tubular assembly 10 is disclosed for passing fluids within a hydrocarbon recovery well. The tubular assembly 10 has an insulated connection 12 between insulated tubing segments 14, 16. Tubing segments 14, 16 are connected via a threaded connection, and the resulting joint 10 is insulated by an external insulating sleeve 18. The insulating sleeve 18 may have unitary construction, such that the sleeve 18 may only be installed or removed by first breaking apart the joint 10. Alternatively, the sleeve 18 may comprise a plurality of arcuate partial-sleeves, which may be assembled about or removed from the completed joint 10 without first breaking apart the joint 10.

14 Claims, 4 Drawing Sheets

INSULATED TUBULAR ASSEMBLY

FIELD OF THE INVENTION

This invention relates to insulated pipe strings for use in hydrocarbon recovery wells. More particularly, this invention relates to a tubular assembly having an improved insulated joint between insulated tubular segments.

BACKGROUND OF THE INVENTION

Hydrocarbon recovery wells for producing oil and gas involve using long tubing strings to convey the hydrocarbons from the downhole reservoir to the surface. In many instances it is desirable to maintain temperature and minimize heat loss from substances flowing through the string. In more conventional oil recovery operations, the oil may already be highly flowable within the reservoir. Nevertheless, because the viscosity of oil increases as it cools, minimizing heat loss helps the oil maintain flowability, making it easier and less costly to produce.

In some recovery operations, however, oil may be very viscous within the reservoir. It may then be necessary to heat the oil downhole in order to produce it in economically viable quantities. Minimizing heat loss in the string is therefore more critical. In these situations, hot steam is typically passed downhole through the tubing string to release the thickened or trapped oil so it becomes flowable. Insulated tubing strings minimize heat loss from the steam and oil.

An older method of insulating a tubular assembly involved applying insulation to the outside of a tubing string, such as described in U.S. Pat. No. 3,763,935. The insulation extended from the earth's surface down to the bottom of the permafrost zone, in a continuous cylindrical form. This method of insulation had several disadvantages, however. Applying thermal insulation in this manner was expensive and time consuming. The insulation was also quite fragile under typical drilling conditions.

A newer category of insulated tubing strings involves stringing together double-walled insulated tubing segments. Generally, each insulated tubing segment has an outer tube disposed about an inner tube and defining an annular space therebetween. The annular space is sometimes filled with insulating material. Alternatively, a vacuum may be established in the annulus to insulate the tubing. Heat transfer is therefore minimized between the inner wall, which may be exposed to hot oil and steam, and the outer wall, which may be exposed to the cooler interior of the well bore or to atmosphere. U.S. Pat. No. 4,512,721, for example, discloses insulated tubing having a vacuum annulus filled with a "getter material" for absorbing gases that can migrate into the annulus at high temperatures. U.S. Pat. No. 3,680,631 discloses insulated tubing combining the use of vacuum and solid thermal insulation, for passing warm fluids through a permafrost zone.

Despite their increased durability and ease of assembly, the use of insulated tubing segments has inherent disadvantages. A major problem with joining insulated tubing segments is that excessive heat loss may occur at the joint between segments. This is because an insulated segment is not insulated at its ends where the outer tube is joined with the inner tube to seal the annulus between the inner and outer tube. Heat may therefore be conducted away from the interior of the tubing along a conductive flow path at each joint, at a much higher rate than through the insulated portion of the tube. This results in greater heat loss and reduced efficiency.

A number of solutions have been proposed to minimize heat loss at the joint between insulated tubing segments. U.S. Pat. No. 4,518,175 discloses an insulated tubular assembly having insulation underneath an external coupler at the tubing joint. A frustoconical member supports and positions the inner pipe relative to the outer pipe of each tubing segment. The frustoconical member extends diagonally upward from an end of the inner tube to an adjacent end of the outer tube. The insulation at the joint is layered between the external coupler and the frustoconical member, and extends over a portion of the insulated tubing annulus. The overlapping annulus insulation and joint insulation essentially provides continuous insulation along the tubular assembly, minimizing heat loss at the joint.

U.S. Pat. No. 4,415,184 discloses an insulated tubular assembly having insulation between an external coupling and the insulated tubing segments at the tubing joint. A fluid-tight thrust ring seals and joins adjacent ends of the inner and outer tubes of each tubing segment. Insulation is sandwiched between the thrust rings and the external coupler that couples two insulated tubing segments. The insulation may be cast in place during manufacture of the tubing segments, or inserted during installation of the tubular assembly. An additional ring of insulation must be inserted at the joint between the ends of the tubing segments to provide continuous insulation along the joint.

Yet another way of insulating the joint internal to a coupler is provided by U.S. Pat. No. 4,693,313. An external coupler joins two tubing segments, leaving a substantial gap between the joined ends. The gap created between the coupled segments is insulated by means of a coupling insulator, which typically includes suitable insulation material. A tubular shield is positioned inside the coupling insulator to shield the joint insulation material from fluids passing through the tubular assembly.

A different approach to insulating the joint is provided by U.S. Pat. No. 4,538,834. The tubing segments are joined with only a slight gap or space left between them at the joint. Condensate of the fluid flowing through the assembly is trapped in the space, which may form a thermal barrier between the fluid flowing through the assembly and the ambient environment.

The above insulating tubing joints and methods have the drawback that the insulation at the joint is fitted internal to the coupler. Applying insulation during the manufacture of each tubing segment in this way can be complicated and expensive. For example, the insulation must be installed so the coupler will later fit around it when joining two insulated tubing segments. If the coupler does not fit properly during installation, it may not be correctable in the field during installation, while away from the manufacturing facility. If the insulation is instead applied in the field during installation, this can be a complicated or time-consuming step.

Another complication with the above tubing joints is that it may be difficult or impossible to repair or replace the insulation once in the field. The joint will most likely have to be disassembled to access the insulation. Whether the insulation needs replacement may be difficult or impossible to discern, because it is hidden within the joint. Especially in a long tubing string, a great deal of effort is required to break apart each joint whose insulation needs inspection or repair.

A further disadvantage of having insulation on the inside of a coupler of a joint is that the flow through the tubular assembly may be disrupted. For example, the tubular assembly of U.S. Pat. No. 4,693,313 requires installing a shield to prevent flow within the inner tube from impinging the joint insulation. Even with this extra step, the shield might impede the flow or cause turbulent flow.

The disadvantages of the prior art are overcome by the present invention. An insulated tubular assembly is provided having an improved insulated joint that is easier and less expensive to manufacture, install, repair, and replace.

SUMMARY OF THE INVENTION

An insulated tubular assembly is disclosed for passing fluids within a hydrocarbon recovery well. The tubular assembly is formed by stringing together double-walled tubing segments. The tubular assembly has an improved insulated joint between tubing segments, making the tubular assembly easier and less expensive to manufacture, install, repair, and replace.

In a preferred embodiment, the assembly includes a plurality of consecutively joined insulated tubing segments. Each tubing segment includes an inner tube, an outer tube, and two opposing ends. An inner tube defines an inner passage for conveying fluids. An outer tube is concentrically disposed about the inner tube, and an annulus is defined between the inner and outer tubes. An annular bridge at each end connects the inner tube to the outer tube. Together, the annular bridges seal the annulus between the inner and outer tube, such as for sustaining a vacuum and/or containing an insulating material. The inner tube has an extension extending outwardly from at least one of the two ends. The insulated tubing segments are joined by a threaded connection, which connects an extension of a first tubing segment with an extension of a second tubing segment to form a joint. An insulating sleeve surrounds the joint.

In another preferred embodiment, a method is provided for insulating a tubular assembly by stringing together a plurality of insulated tubing segments. Each tubing segment includes two opposing ends, an inner tube defining an inner passage adapted for conveying fluids, an outer tube concentrically disposed about and defining an annulus with the inner tube, and an annular bridge at each opposing end. Each annular bridge connects the inner tube to the outer tube, together sealing the annulus from atmosphere, for sustaining a vacuum and containing an insulating material therein. The inner tube has an extension extending outwardly from at least one of the two ends. The method further involves threadably connecting an extension of a first tubing segment with an extension of a second tubing segment to form a joint. Finally, an insulating sleeve is positioned around the joint to insulate the joint.

It is a feature of this invention that the threaded connection may comprise a female thread on the extension of the first tubing segment, and a male thread on the extension of the second tubing segment. The male and female threads may be threadably engaged to form an integral joint between the first and second tubing segments.

Alternatively, the threaded connection may comprise a tubular coupling having opposing first and second threaded box ends, and a central passageway for passing fluid therethrough. There is also a threaded pin end on the extension of each of the first and second tubing segments. The first and second tubing segments are joined by threading the pin end of the first tubing segment with the first box end of the tubular coupling, and threading the pin end of the second tubing segment with the second box end of the tubular coupling.

Another feature of this invention is that the insulator sleeve may have an outer diameter substantially equal to or less than an outer diameter of the insulated tubing segments, with an advantage being that the sleeve does not contact the well bore as the tubular assembly is moved within the well bore. Alternatively, the outer diameter of the insulator sleeve may be greater than the outer diameter of the tubing segments, with an advantage that the sleeve may act as a bumper to protect the tubing segment from contacting the well bore as the tubular assembly is moved within the well bore.

Yet another feature is the sleeve may be long enough to extend across the entire exposed portion of the tube joint. One related advantage is that insulation of the tubular assembly is continuous along the otherwise exposed portion of the tube joint between the insulated tubing segments. Another related advantage is the transition from tubing segment, across the sleeve/joint, and to the next tubing segment, may be substantially smooth. Alternatively, the sleeve may be longer, to completely cover and extend beyond the entire exposed portion of the tube joint, substantially overlapping with the annulus of each adjoining insulated tubing segment.

Another feature is the sleeve may comprise an inner sleeve for thermal insulation, and an outer shell made of a rigid material such as a metal or a plastic. A related advantage of this rigid outer shell is that it may increase the durability of the sleeve, which is especially advantageous when the sleeve is also used as a bumper.

A further feature is the sleeve may have a unitary tubular body, such that the sleeve may be positioned at the joint only when the joint is broken apart. An advantage is that a unitary sleeve may have maximum durability. Alternatively, the sleeve may be formed by a plurality of arcuate partial sleeves for interconnection about the tube joint to form a full sleeve. An advantage of this alternative is the sleeve may be positioned about or removed from the joint without breaking the joint.

These and further objects, features, and advantages of the present invention will become apparent from the following detailed description, wherein reference is made to the figures in the accompanying drawings.

BRIEF DESCRIPTION OF THE DRAWINGS

FIG. 2A illustrates an alternate embodiment of the tubular assembly, in which the insulating sleeve overlaps the insulated tubing segments and a cage surrounds the insulated joint.

DETAILED DESCRIPTION OF THE PREFERRED EMBODIMENTS

Figure 1:
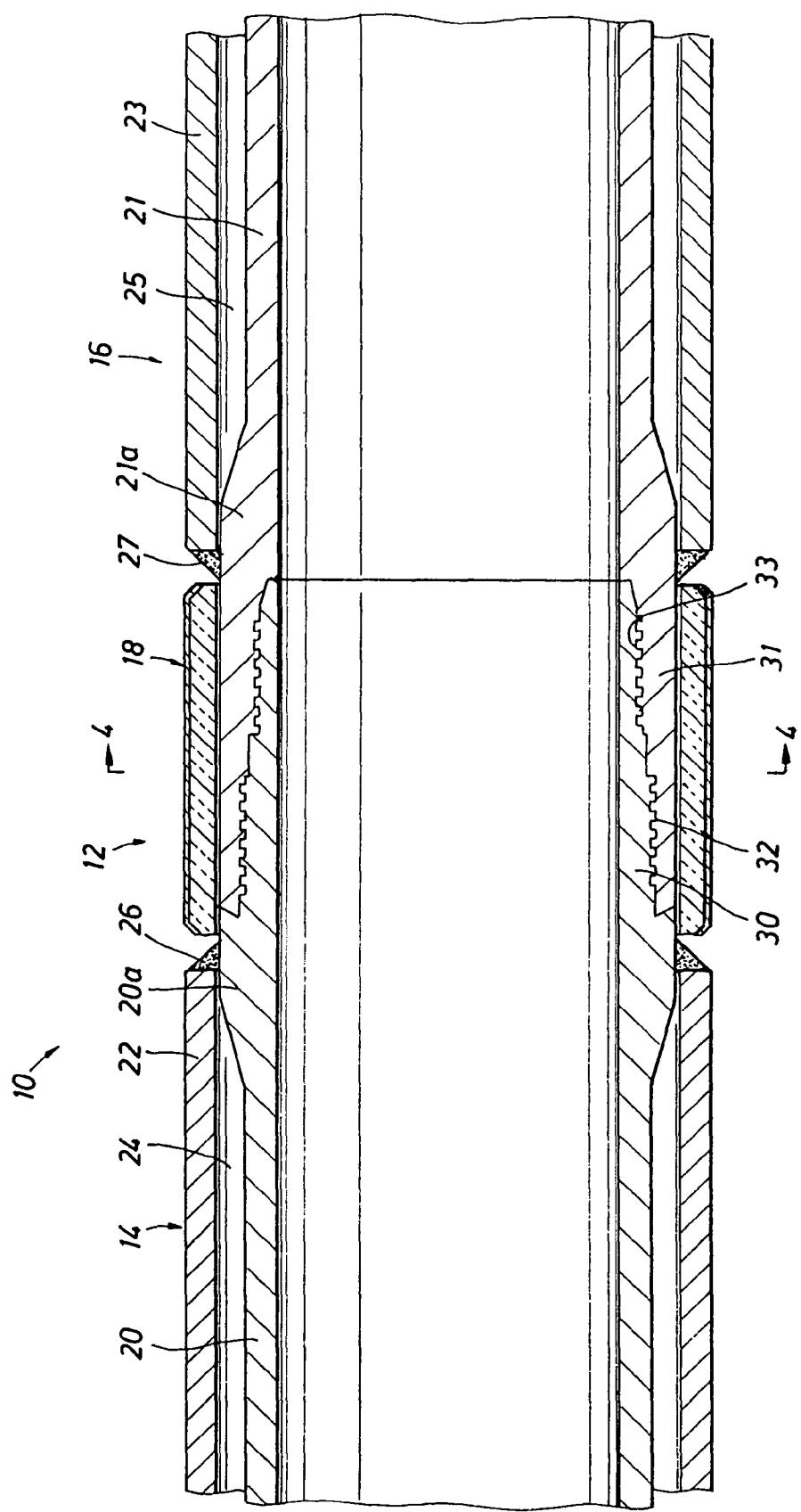
FIG. 1 illustrates an embodiment of the tubular assembly, in which the joint comprises a male thread on one insulated tubular segment coupled with a female thread on another tubular segment. An insulating sleeve surrounds the joint.

FIG. 1 shows an embodiment of an insulated tubular assembly 10, having a connection 12 between two insulated tubing segments 14, 16. An insulating sleeve 18 surrounds the connection 12. Each tubing segment 14, 16 has a double-walled insulated construction, which includes an inner tube 20, 21, an outer tube 22, 23 concentrically disposed about the inner tube 20, 21 and an annulus 24, 25 between the inner tube 20, 21 and the outer tube 22, 23. Each end of each tubing segment 14, 16 has an annular bridge 26, 27, which connects the inner tube 20, 21 to the outer tube 22, 23. The annular bridge 26, 27 may be a fillet weld joining an upset portion 20a, 21a, formed on tubes 20, 21 respectively, to outer tubes 22, 23, to seal the annulus from atmosphere. The annulus 24, 25 may thereby sustain a vacuum and/or contain an insulating material, to insulate each tubing segment 14, 16.

The inner tube 20, 21 of tubing segments 14, 16 each have an extension 30, 31 extending outwardly from at least one end of each tubing segment 14, 16. For example, the extensions 30, 31 may be portions of the inner tubes 20, 21 that extend beyond the bridges 26, 27, respectively. A threaded connection connects the extension 30 with the extension 31. In FIG. 1, this threaded connection includes a male thread or "pin" 32 on extension 30, and a female thread or "box" 33 on extension 31. Thus, the tubing segments 14, 16 may be threadably joined to form an integral connection 12.

A conductive flow path occurs where the inner tube 20, 21 meets the outer tube 22, 23 of each tubing segment 14, 16. Thus, despite the insulating properties of tubing segments 14, 16 about the annulus 24, 25, excessive heat transfer may be occur at the connection 12. To minimize heat loss at the connection 12, the insulating sleeve 18 is provided about the connection 12.

Figure 2:
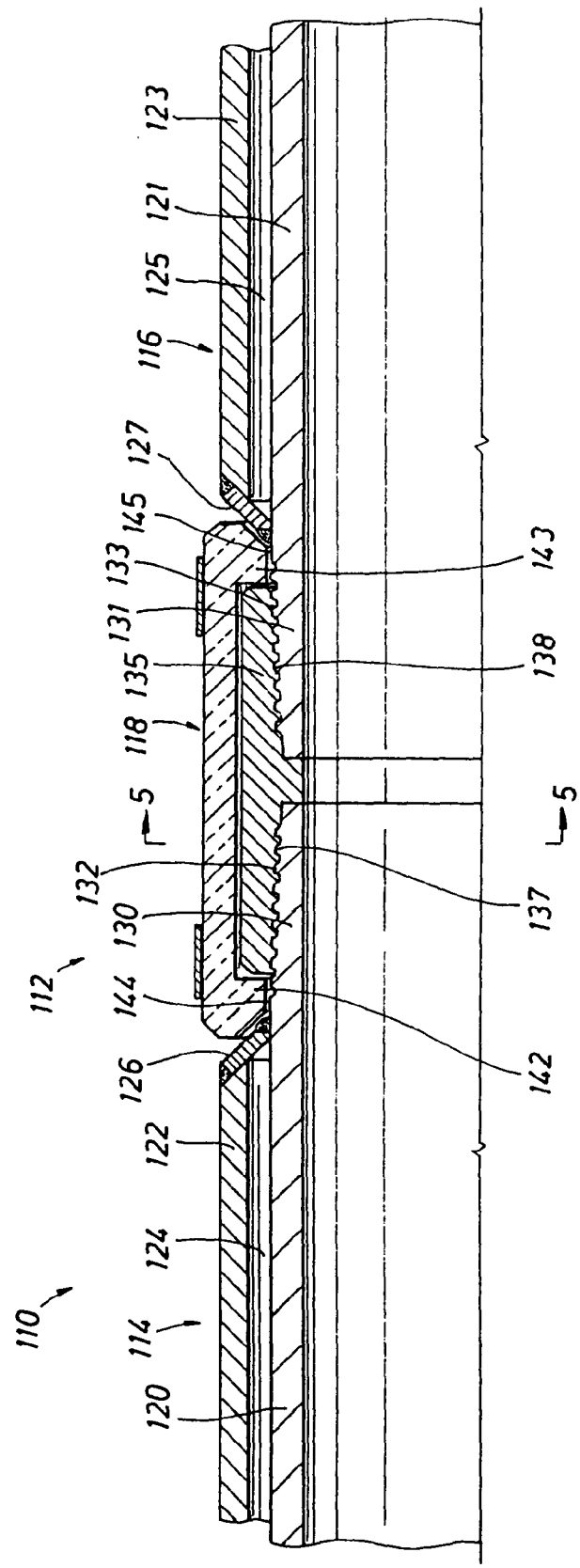
FIG. 2 illustrates an alternate embodiment of the tubular assembly, in which the joint comprises a threaded coupling joining threaded ends of two tubular segments.

FIG. 2 illustrates another embodiment of the tubular assembly 110 having a connection 112. Similar to tubing segments 14, 16 of tubular assembly 10, tubing segments 114, 116 have inner tubes 120, 121, outer tubes 122, 123, and annuli 124, 125 therebetween for sustaining a vacuum and/or contain an insulating material. Annular bridges in the form of frustoconical thrust rings 126, 127 connect, by welding, the inner tubes 120, 121 with respective outer tubes 122, 123 to close off the annulus to atmosphere. Tubing segments 114, 116 have extensions 130, 131 on at least one end of each tubing segment 114, 116. The extensions 130, 131 may be portions of the inner tubes 120, 121 that extend beyond the bridges 126, 127.

The connection 112 of tubular assembly 110 comprises a tubular coupling 135 for receiving extensions 130, 131 of tubing segments 114, 116. Tubular coupling 135 has threaded box ends 137 and 138, which mate with respective pin threads 132 and 133, to join tubing segments 114, 116.

Like the tubular assembly 10 in FIG. 1, the tubular assembly 110 in FIG. 2 includes an insulating sleeve 118 to insulate the connection 112. The sleeve 118 may include annular flanges 142, 143 projecting radially inwardly to substantially fill gaps 144, 145 between the coupling 135 and bridges 126, 127. The sleeve 118 surrounds the connection 112 to insulate the connection 112.

The sleeve of a tubular assembly preferably extends across an entire connection such that the insulation of the tubular assembly may be substantially continuous along the tubular assembly, i.e., from one insulated tubing segment, across a connection, to a next tubing segment. To increase reliability and effectiveness of the insulation, the insulation may extend beyond the connection to substantially overlap the annulus within the insulated tubing segments. An outer diameter of the sleeve may be less than or substantially equal to that of adjacent tubing segments, such that the sleeve is protected from damage as the tubular assembly is moved within the well. Alternatively, the outer diameter of the sleeve may be greater than that of adjacent tubing segments, to radially space the tubing segments from the well bore, thereby acting as a bumper to protect the tubular assembly.

FIG. 2A illustrates an alternate way of insulating a connection, such as connection 112 of FIG. 2, to help maximize insulation and ensure the entire connection 112 is insulated. An insulating sleeve 218 extends across the entire connection 112, and the ends 204, 206 of the insulating sleeve 218 overlap the annuli of insulated tubing segments 114, 116, to minimize any heat loss that might otherwise occur through the connection 112.

FIG. 2A also illustrates the use of a cage 220 surrounding an insulating sleeve 218 and the connection 112. The cage 220 is clamped to insulated tubing segments 114, 116 with clamps 208, 212. Hinges 210, 214 allow the cage 220 to be clamped around the "made up" connection 112 without breaking out the connection 112. The insulating sleeve 218 may be split lengthwise to fit around the connection 112 without breaking out the connection 112. The cage 220 may have additional uses, such as to route hydraulic lines or signal wires for use with downhole tools. The cage 220 helps protect the insulating sleeve 218 and any lines, wires, etc. routed through the cage 220. The cage 220 is sized to fit downhole in the wellbore.

Figure 3:
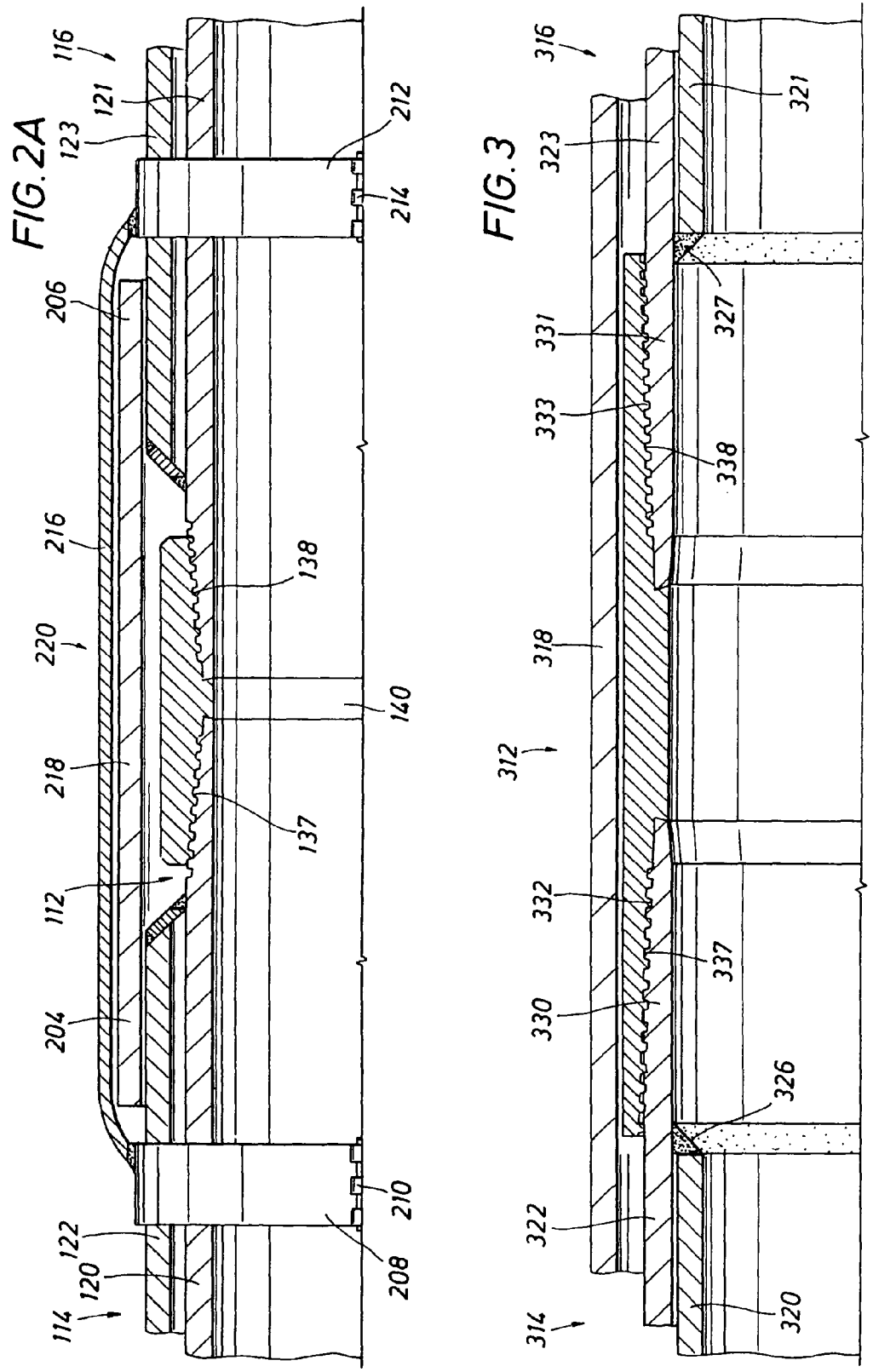
FIG. 3 illustrates an alternate joint in which the outer tubes have threaded extensions for joining insulated tubing segments.

FIG. 3 illustrates an alternate connection 312 between insulated tubing segments 314, 316, in which extensions 330, 331 extend from outer tubes 322, 323 rather than from inner tubes 320, 321. The extensions 330, 331 may simply be portions of the outer tubes 322, 323 which extend beyond bridges 326, 327. A tubular coupling 335 has threaded box ends 337, 338 which mate with pin threads 332, 333, respectively, to join insulated tubing segments 314, 316. An insulating sleeve 318 surrounds the connection 312.

Figure 4:
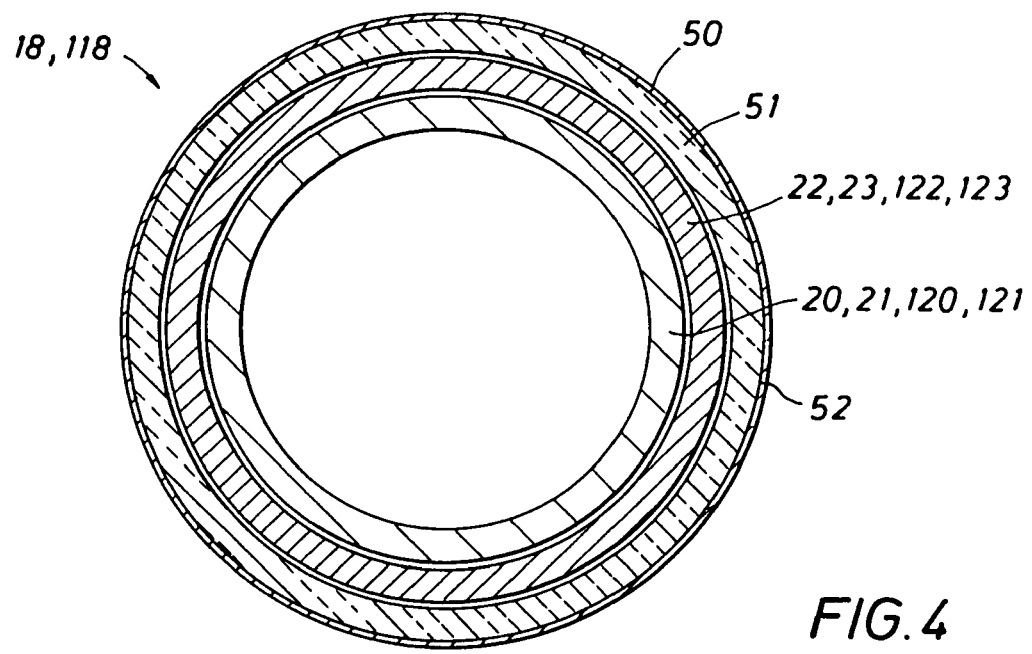
FIG. 4 shows a cross section of the tubular assembly joint, such as A—A or B—B in FIG. 1 or 2. The insulating sleeve shown has a unitary tubular construction, such that the sleeve cannot be installed or removed from the joint unless the joint is first broken apart.

FIG. 4 is a cross-sectional view depicting an embodiment of an insulating sleeve such as sleeve 18 or 118 having unitary tubular construction. Unitary tubular construction means that at least a portion of the sleeve 18, 118 has a continuous tubular shape. Thus, to be completely installed or removed from the tubular assembly 10, 110, the connections 12, 112 must first be broken apart. Preferably, the entire sleeve 18, 118 has a rigid or unitary "one-piece" construction. Alternatively, this unitary sleeve may comprise a plurality of separate pieces, with at least one piece having a continuous tubular portion. For example, the sleeve 18, 118 may still have a separate inner core 51 and outer shell 50. The inner sleeve 51 and outer shell 50 may be separated from each other by axially sliding the inner sleeve 51 with respect to the outer shell 50. The primary advantages of the unitary construction is that the sleeve may be stronger and have fewer pieces, if any, to assemble.

Figure 5:
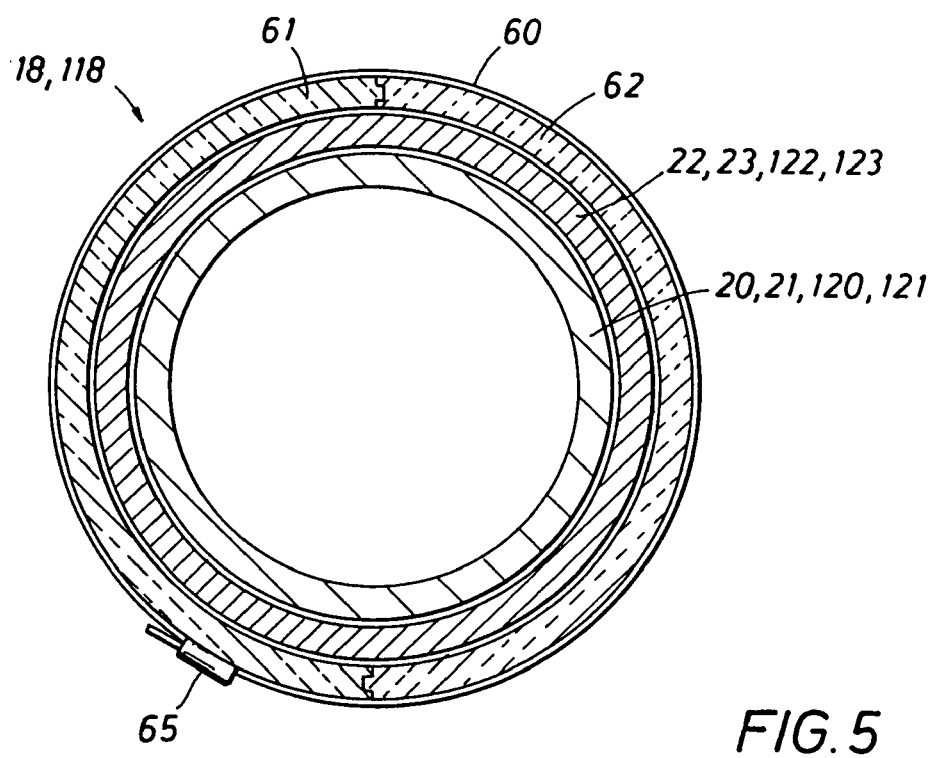
FIG. 5 shows a cross section of the tubular assembly joint, such as A—A or B—B in FIG. 1 or 2. The alternative insulating sleeve shown has a plurality (in this case, two) arcuate partial sleeves for interconnection about the tube joint to form a full sleeve. This sleeve may be installed or removed from the tubular assembly without breaking apart the joint.

FIG. 5 depicts an alternate embodiment of an insulating sleeve comprising a plurality of arcuate partial-sleeves for interconnection about the tube connection to form a full sleeve. In this figure, the plurality of arcuate partial-sleeves shown are two arcuate half-sleeves 60, 61 surrounded by an outer shell 60. The outer shell 60 may be a metal band tightened about the half-sleeves 61, 62 via a tensioner 65, as shown. Alternatively, the outer shell 60 may comprise a metal clamp for clamping together the half-sleeves 61, 62. The primary advantage of this sleeve embodiment is the half sleeves 61, 62 may be positioned about or removed from a completed connection 12, 112, without breaking apart the connection 12, 112.

In some embodiments, the sleeve may have a substantially homogeneous construction, such that the entire sleeve is made from a single insulating material or group of insulating materials. More likely, however, the sleeve will comprise an insulating inner sleeve for thermal insulation, such as may be represented by sleeve 51, and a tubular outer shell, such as may be represented by the outer shell 50 surrounding the inner sleeve 51.

The insulating material from which the sleeve is made can comprise a variety of materials that are naturally insulating in that they exhibit minimal to no heat conduction. Thus, various polymeric materials may be employed, either alone or in a mixture with fillers. Non-limiting examples of such polymeric materials include biaxially oriented polytetrafluoroethylene, polyurethane, etc. Additionally, the insulating material of the sleeve can be made from expanded exfoliated graphite, as well as from various expanded inorganics such as silicate materials, including vermiculite, etc. When inorganic and mineral materials such as silicates, expanded graphite, etc. are used, they can include reinforcing fillers such as fiberglass, carbon fibers, etc., as well as binders, which can be incorporated and provide the insulating material with structural integrity. A preferred insulating material can comprise an inorganic material such as an expanded silicate, together with a binder, the binder being any one of numerous polymeric materials, both thermoplastic and thermosetting in nature. When the insulating sleeve is comprised of composite materials such as expanded silicates and binders, it will generally include a tubular outer shell as mentioned above, metallic in nature, and preferably, aluminum, stainless steel, etc.

The outer shell 50 and inner core 51 may be separable, or they may instead be bonded together at an interface 52. The harder, tougher outer shell 50 may be especially important to protect the sleeve when the sleeve 18, 118 is used as a bumper as described above.

A string may be assembled as long as necessary from a plurality of insulated tubing segments, such as to reach from the earth's surface to an underground reservoir. Each insulated tubing segment may have an extension at each of two opposing ends, such that a connection may be formed at each end of the tubing segment. An insulating sleeve may be installed at each connection, such that the tubular assembly is continuously insulated along its length, without interruption at each connection.

It will be understood by those skilled in the art that the embodiment shown and described is exemplary and various other modifications may be made in the practice of the invention. Accordingly, the scope of the invention should be understood to include such modifications which are within the spirit of the invention.

The invention claimed is:

1. An insulated tubular assembly comprising:
   a plurality of consecutively joined tubing segments, each tubing segment comprising:
   (a) two opposing ends;
   (b) an inner tube defining an inner passage adapted for conveying fluids;
   (c) an outer tube concentrically disposed about and defining an annulus with said inner tube;
   (d) an annular bridge at each opposing end, each annular bridge connecting said inner tube with said outer tube;
   (e) a box member having an external cylindrical surface and an internal female thread formed on said extension of said first tubing segment; and
   (f) a pin member having an external male thread formed on said second tubing segment for threadably engaging said female thread of said box member to form a threaded joint between said first and second tubing segments; and
   an insulating sleeve in surrounding relationship to said box member, said insulating sleeve having a substantially uniform wall thickness from its upper end to its lower end, and having a substantially cylindrical inner surface exterior of said box member from said upper end to said lower end.

2. An insulated tubular assembly as defined in claim 1, wherein said insulating sleeve further comprises:
   an outer diameter substantially equal to or less than the outer diameter of the tubing segments.

3. An insulated tubular assembly as defined in claim 1, wherein said insulating sleeve extends axially at least substantially between ends of said threaded joint, such that said insulating sleeve is substantially continuous along the exposed portion of the threaded joint between the insulated tubing segments.

4. An insulated tubular assembly as defined in claim 1, wherein said insulating sleeve further comprises:
   an insulating inner core for thermal insulation; and
   a tubular outer shell surrounding the insulating inner core.

5. An insulated tubular assembly as defined in claim 4, wherein the tubular outer shell comprises:
   a rigid material selected from the group consisting of plastics and metals.

6. An insulated tubular assembly as defined in claim 1, wherein said insulating sleeve is a unitary tubular body.

7. An insulated tubular assembly as defined in claim 1, wherein said insulating sleeve is selected from the group consisting of polymeric materials, expanded inorganic materials, expanded graphite and mixtures thereof.

8. An insulated tubular assembly as defined in claim 7, wherein said insulating sleeve is comprised of a particulate inorganic material and a binder selected from the group consisting of thermoplastic resins, thermosetting resins, and mixtures thereof.

9. An insulated tubular assembly comprising:
   a plurality of consecutively joined tubing segments, each tubing segment comprising:
   (a) two opposing ends;
   (b) an inner tube defining an inner passage adapted for conveying fluids;
   (c) an outer tube concentrically disposed about and defining an annulus for said inner tube;
   (d) an annular bridge at each opposing end, each annular bridge connecting said inner tube or said outer tube;
   (e) a tubular coupling having first and second box ends with internal female threads and an external cylindrical surface; and (f) a pin member having an external male thread formed on each of said first and second tubing segments for threadedly engaging said female threads of said first and second box ends, respectively, to form a threaded joint between said first and second tubing segments; and an insulating sleeve in surrounding relationship to said coupling, said insulating sleeve having a substantially uniform wall thickness from its upper end to its lower end, and having a substantially cylindrical inner surface exterior of said coupling from said upper end to said lower end.

10. An insulated tubular assembly as defined in claim 9, wherein said insulating sleeve extends axially beyond said threaded joint, to substantially overlap the annulus of each adjoining tubing segment.

11. The insulated tubular assembly of claim 9, wherein a selectively removable cage is disposed in surrounding relationship to said insulating sleeve.

12. An insulated tubular assembly as defined in claim 9, wherein said insulating sleeve extends axially at least substantially between ends of said threaded joint, such that said insulating sleeve is substantially continuous along the exposed portion of the threaded joint between the tubing segments.

13. An insulated tubular assembly as defined in claim 9, wherein said insulating sleeve further comprises:

an insulating inner core for thermal insulation; and a rigid material selected from the group consisting of plastics and metals forming a tubular outer shell surrounding the insulating inner core.

14. An insulated tubular assembly as defined in claim 9, wherein said insulating sleeve is selected from the group consisting of polymeric materials, expanded inorganic materials, expanded graphite and mixtures thereof.

* * * * *